June 22, 1965 R. K. H. GEBEL 3,191,086

SECONDARY EMISSION MULTIPLIER INTENSIFIER IMAGE ORTHICON

Filed Nov. 23, 1960 2 Sheets-Sheet 1

INVENTOR.
RADAMES K.H. GEBEL

BY Wade Koontz
George O. Sailer
ATTORNEYS

SECONDARY EMISSION MULTIPLIER INTENSIFIER IMAGE ORTHICON

Filed Nov. 23, 1960 2 Sheets-Sheet 2

INVENTOR.
RADAMES K.H. GEBEL
BY Wade Koontz and
George O. Sable
ATTORNEYS

United States Patent Office 3,191,086
Patented June 22, 1965

3,191,086
SECONDARY EMISSION MULTIPLIER INTENSIFIER IMAGE ORTHICON

Radames K. H. Gebel, Dayton, Ohio, assignor to the United States of America as represented by the Secretary of the Air Force Filed Nov. 23, 1960, Ser. No. 71,368
1 Claim. (Cl. 313—65)
(Granted under Title 35, U.S. Code (1952), sec. 266)

The invention described herein may be manufactured and used by or for the United States Government for governmental purposes without payment to me of any royalty thereon.

The invention relates to an improved television pickup tube, and more particularly to an image orthicon tube, which when used in conjunction with a suitable optical system can perceive scenes at light levels far below the level possible to achieve with the unaided human eye.

The orthicon, the most sensitive camera tube in general use, is known to the prior art and described in United States Patent No. 2,460,093 to H. B. Law. In the image orthicon, a photoelectric current density pattern corresponding to the image on the photocathode is directed at and focused on a thin glass membrane or target with such energy that the secondary emission ratio of the target is greater than one. The target accumulates a positive charge pattern in areas corresponding to illuminated areas in the image. This charge pattern is neutralized by a low velocity electron beam which scans the opposite side of the target in the desired scanning pattern. The scanning beam is composed of electrons, emitted in a random manner from the space charge at the cathode, which represent a constant current flow when averaged over a sufficiently long time. At any time interval, however, the number of beam electrons passing a given point may vary widely.

This beam fluctuation current in the image orthicon is almost completely added to the signal current representing the desired image, and forms a spurious signal which may completely mask a signal from a low light level scene. At low light level operations then, the stored charge at the target plate becomes so small that the noise from the scanning beam no longer permits detection. A means which will increase the amplitude of the signal current to be read off the target for a given scene brightness which will increase the signal to fluctuations ratio is therefore necessary to increase the efficiency of the tube.

It is thus an object of the invention to provide an image orthicon camera tube which when used in conjunction with a suitable optical system can perceive scenes at far lower light levels than the human eye can see.

It is another object of the invention to provide a television tube, of the image orthicon type, having an improved image section which will produce a picture under lower intensity scene illumination.

It is a further object of this invention to provide an image orthicon tube having a low noise image amplifier between the photocathode and the target which will allow the image orthicon tube when used in conjunction with a suitable optical system to perceive scenes at far lower light levels than the human eye can see.

Other objects, novel features, and advantages of this invention will become apparent upon consideration of the embodiments illustrated in the accompanying drawings and hereinafter described.

Figure 1:
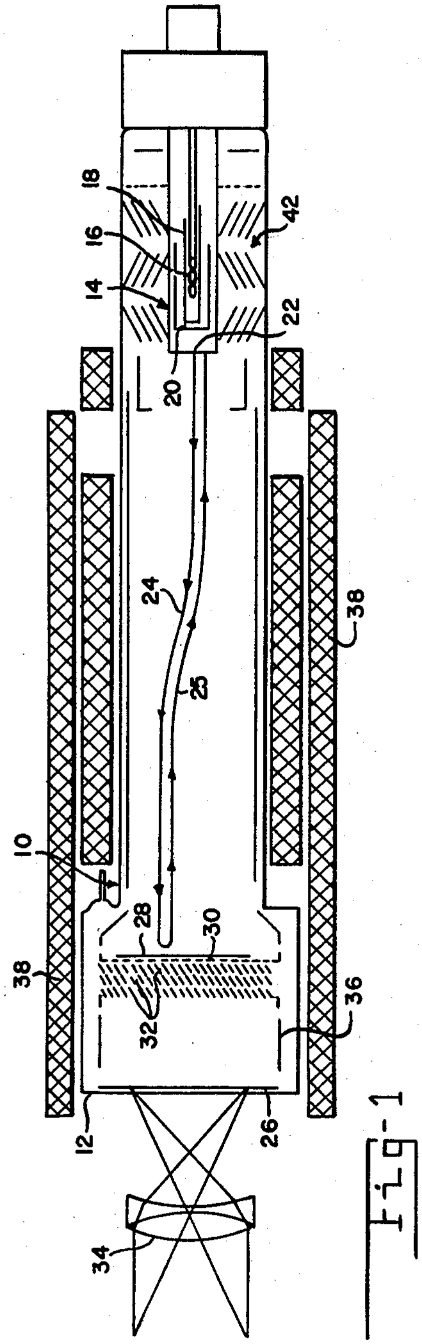
FIGURE 1 is a schematic diagram of the image orthicon tube which constitutes the invention.

Referring now more particularly to FIGURE 1, an image orthicon camera tube is shown comprising a glass envelope 10 having an enlarged portion 12 at one end for enclosing the image section of the tube. At the opposite end of the envelope 10 is an electron gun 14 having a conventional heater 16, cathode 18, and control grid structures 20 and 22 for producing an electron beam 24. Located at the end of the tube opposite the electron gun 14 is a photocathode electrode 26 wthin the enlarged portion 12 of the envelope and spaced from the photocathode electrode 26 is the glass target electrode 28. A fine mesh screen 30 is mounted closely spaced from the photocathode side of the target electrode 28. Between the photocathode 26 and the mesh screen 30 are a series of electron multiplier plates 32.

A lens 34 positioned to the left of the tube is used to form an optical image of the scene being televised on the photoemissive layer of the photocathode 26. The purpose of the layer is to transform the optical image into an electrical image by emitting electrons toward the right into the interior of the tube when light falls on it from the left. The number of electrons emitted at each point is directly proportional to the intensity of the illumination in the image at that point.

The primary electrons from the photocathode are magnetically focused and accelerated by an electrostatic field established by accelerator grid 36 and focusing coil 38 and hit the first mutiplier plate in the electron multiplier portion of the image section. The primary electrons cause the release of secondary electrons from the first multiplier plate. These, in turn, are multiplied at each further multiplier plate causing an amplification of the stream of electrons.

The preamplified stream of electrons move further to the right through the application of a positive potential difference between a last multiplier plate and the mesh screen 30. The electrons passing through the mesh strike the target 28 with sufficient energy so that several secondary electrons are released from the target surface for each striking electron. Most of these secondaries are collected by the mesh 30, which is normally maintained a volt or two positive with respect to the surface of the glass target. In this manner, there is set up on the photocathode side of the target electrode 28 a charge pattern corresponding to the pattern of light and shade focused on the photocathode 26. Due to the extreme thinness of the target electrode 28, there is established a potential pattern of positive charges on the scan side of the target electrode corresponding to the charge pattern on the photocathode side of the target.

The electron beam 24 will approach the target 28 at a very low velocity immediately in front of the target surface. When the beam approaches target areas which are at zero potential, it is reflected back towards the electron gun 14. However, a more positive area of the target surface will cause electrons from the approaching beam to land in numbers sufficient to neutralize the positive potential charge at that area and drive the charge area of the target to cathode potential. The remaining electrons of the beam are then reflected back to the gun end of the tube. In this manner, as the electron beam is scanned over the target surface, there is reflected towards the gun end of the tube a modulated return beam 25. The return beam 25 follows substantially the same path as the instant beam 24 and strikes the end of the gun structure 14 which is formed as a dynode electrode, and as the first stage of the multiplier section 42. Each electron in the returning beam strikes the first dynode with sufficient energy to release several secondary electrons. These, in turn, are accelerated into the pinwheel multiplier structure. Secondary emission gains for a typical five-stage electron multiplier are between 500 and 1500. The output current is closely proportional to the current in the return beam.

Figure 2:
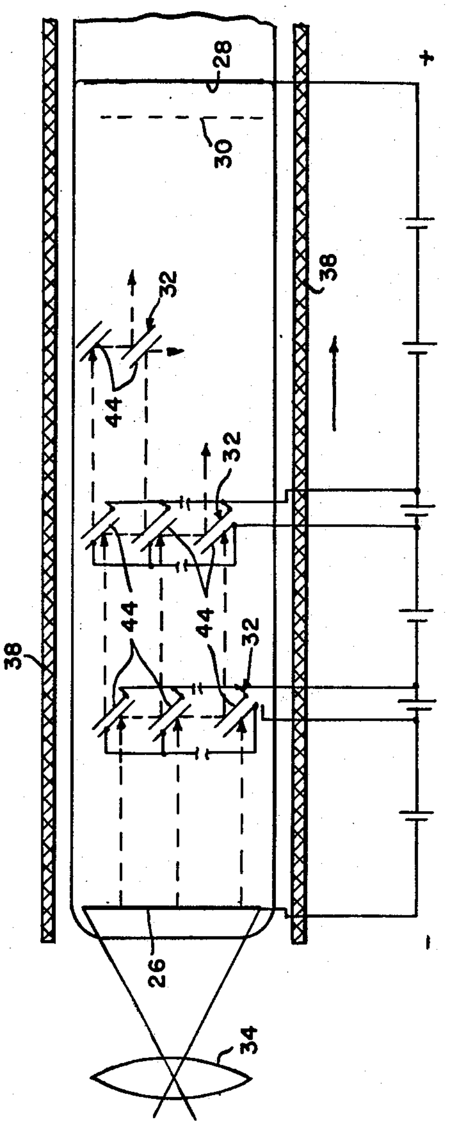
FIGURE 2 is a schematic diagram illustrating the image section of the image orthicon of the invention.

FIGURE 2 illustrates the novel internal structure of the image section of the image orthicon tube more particularly. The electron multiplier portion of the image section is located between the photocathode 26 and the target collector mesh 30. The electron multiplier portion is made up of a series of parallel, closely spaced secondary emission multiplier plates in cascade. The multiplier plates can be spaced uniformly between the photocathode and the collector mesh screen as shown in FIGURE 2, or, preferably, the multiplier plates are placed close to the target collector mesh, as shown in FIGURE 1, so that the photo surface of the photocathode can be formed in the normal manner by evaporation from sources located on the target support cup. The multiplier plates are spaced as closely as possible so that the secondary electrons are strongly accelerated by the paraxial electric field with only slight lateral spreading due to emission velocities.

Each electron multiplier plate 32 is constructed of a large number of inclined slats or vanes 44. As indicated in FIGURES 3 through 6, vane 44 is a sandwich comprising two contact electrodes 46 composed, for example, of aluminum, an insulator 48 between the contact electrodes to assure their electrical separation, and a coating of secondary emitting material 50 such as silver, magnesium, or beryllium. The order of placing the constituents of the sandwich may be varied in a number of ways.

Figure 3:
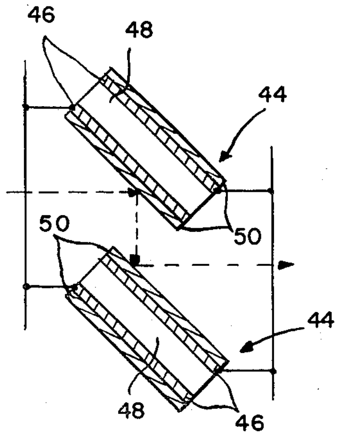
FIGURES 3, 4, 5 and 6 are schematic drawings showing the various possible modifications of vane structure of the Venetian blind multiplier electrodes.
Figure 4:
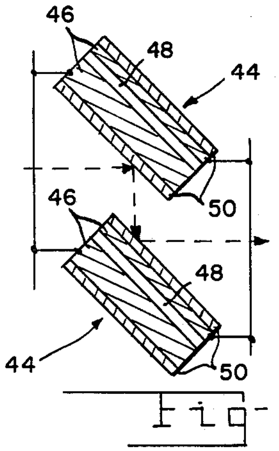
Figure 5:
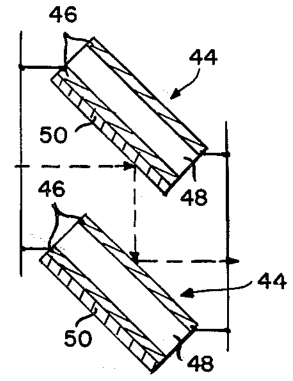
Figure 6:
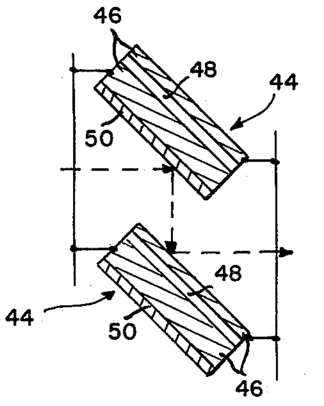

One possible vane construction, illustrated in FIGURES 3 and 5, finds the insulator 48 as the supporting structure for the vanes in each of the cascaded multipliers, with the contacts 46 and the secondary emitting material 50 as thin coatings thereon. FIGURES 4 and 6 show the other possibility, where one of the metal contacts 46 is the supporting structure, thus requiring only one additional conductive layer, and the insulator and the secondary emitter material are thin coatings thereon.

The secondary emitter material 50 can be coated on one side or both sides of the sandwich as illustrated, respectively, in FIGURES 5, 6 and 3, 4. Where only one side is coated, the coated side is positioned facing the photocathode of the tube. When an electron strikes the front surface of a vane with sufficient energy, a release of several secondary electrons from the secondary emitting material takes place. These electrons are directed down to the adjoining vane, as illustrated by the dashed lines in FIGURES 2–6, due to the more positive potential of the back surface contacts. Electrons with sufficient energy striking the back surface of the FIGURES 3 and 4 vane will effect another release of several secondary electrons from the secondary emitting material. The FIGURES 5 and 6 vane structure provides no secondary emitting material on the back surface contact and, when electrons strike the back surface, there will be little net increase in their number. Where a metal such as aluminum is used for the contacts, reflection of the electrons may be considered to take place; that is, for each electron striking the surface, one electron leaves the surface. The secondary emitter coating on each side of the sandwich modification thus produces a double multiplication of electrons in each multiplier plate.

The fabrication of the inclined slat or venetian blind structure is accomplished by known techniques involving mechanical means or photoetching. The fine vane structure can be formed mechanically by means of forming and shearing dies. An alternative procedure would include the steps of forming the carrier sheet between a rubber die and a metal die having a series of parallel ridges whose cross-section is the shape of a sawtooth, coating the formed sheet with a photoresist, exposing the photoresist to a light source placed at an angle so that each vane would shadow the area behind it which is to become a slot in the final multiplier plate, washing away the unexposed photoresist and opening the slots by etching. The contact, insulator and secondary emitting materials are thin coatings, except in the case of the insulator and contact materials when they are used as the carrier and, therefore, may be deposited on the carrier as desired by evaporation techniques.

The operation of the novel image orthicon type camera tube within the image section is more fully understood by reference to FIGURE 2 and the following. The optical image of the scene is focused by lens 34 onto the photocathode 26 of the image section. The photocathode transforms the optical image into an electrical image by emitting primary electrons in proportion to the intensity of the illumination with the image at each point. The primary electrons are magnetically focused and accelerated by an electrostatic field and strike the front vane surfaces 44 of the first of a series of multiplier plates 32.

Each primary electron which strikes the first multiplier plate with the required energy causes the release of several secondary electrons from the secondary emitting material. These secondary electrons are directed down to the adjoining vane due to the more positive potential of the back surface contacts. As explained above, each electron striking the back surface will be further multiplied in the FIGURES 3, 4 modification or merely reflected in the FIGURES 5, 6 modification. The next multiplier plate in the image section is at a higher positive potential than applied to the first multiplier plate. The secondary electrons emitted from the first multiplier plate are accelerated to the second multiplier plate by the positive potential. These secondary electrons strike the secondary emitting material on the front vane surfaces of the second multiplier plate and for each striking electron several more electrons are emitted. These electrons are directed down to the adjoining vane and either further multiplied or reflected. In a similar manner further electron multiplication is accomplished in successive multiplier stages.

The amplified number of electrons move from the last multiplier plate to the target plate 28 where each electron causes the emission of S secondary electrons, producing S positive charges. One of these unit charges is neutralized by the striking electron. The remaining $(S-1)$ unit charges are stored as a positive charge on the target plate, forming an amplified electronic image of the scene.

The number of slats 44 used in such a Venetian blind image multiplier has to be, of course, larger than the lines of resolution required, three to four times may be considered in most cases as sufficient. The number of slats shown in FIGURES 1 and 2 are diagrammatic and a great deal more in the actual device is required. An image multiplier of this type, using a proper coating of secondary emitter on the slats, will give approximately 20 to 40 times amplification per cascaded stage. Two of these cascaded stages between the photocathode and the target plate of an image orthicon will give a preamplification as high as 1000.

The invention is not intended to be limited to the examples of embodiments shown and described but may, on the contrary, be capable of many modifications without departing from the spirit of the invention.

I claim:

An image orthicon tube comprising, in an evacuated envelope, an electron gun for providing a scanning beam, a target electrode spaced from said gun, and swept by said beam, a photocathode positioned at the end of said tube opposite said gun, for projecting a photoelectron image on said target electrode, an electron multiplier disposed between said photocathode and said target electrode, said multiplier including a plurality of closely spaced vanes disposed one above the other and having parallel surfaces inclined with respect to the axis of said tube to intercept primary electrons emitted from said photocathode; each of said vanes consisting of a support member of electrically-insulating material, a coating of electrically-conductive material on those opposed sides of said support member exposed to said photocathode and said target electrode, and a coating having the property of high secondary emission on said coatings of electrically-conductive material; whereby said coatings of secondary emissive material are rigidly supported in the plane transverse to said tube axis by virtue of the relatively large mass of said support member and the cohesive bond developed between the respective coatings in each vane, and voltage source means including connecting lead-in conductor means coupled to said two coatings of electrically-conductive material in such manner as to avoid shadowing of said secondary emissive coatings by said lead-in conductor means, said lead-in conductor means rendering the electrically-conductive coating on the side of said vane exposed to said target positive with respect to the electrically-conductive coating on the side of said vane exposed to said photocathode.

References Cited by the Examiner

UNITED STATES PATENTS

| | | | |
|---|---|---|---|
| 2,236,041 | 3/41 | Teal | 313—105 |
| 2,277,246 | 3/42 | McGee et al. | 313—67 |
| 2,786,157 | 3/57 | Theile | 313—65 |
| 2,821,637 | 1/58 | Roberts et al. | 313—65 |
| 2,898,499 | 8/59 | Sternglass et al. | 313—105 X |

GEORGE N. WESTBY, *Primary Examiner.*

ARTHUR GAUSS, *Examiner.*